(12) United States Patent
Howe et al.

(10) Patent No.: US 10,275,379 B2
(45) Date of Patent: Apr. 30, 2019

(54) MANAGING STARVATION IN A DISTRIBUTED ARBITRATION SCHEME (71) Applicant: International Business Machines Corporation, Armonk, NY (US)

(72) Inventors: Daniel C. Howe, Pflugerville, TX (US); Charles F. Marino, Round Rock, TX (US); Harrison M. McCreary, Austin, TX (US); Mark L. Rudquist, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 15/425,409

(22) Filed: Feb. 6, 2017

(65) Prior Publication Data
US 2018/0225241 A1 Aug. 9, 2018

(51) Int. Cl.
*G06F 13/00* (2006.01)
*G06F 13/364* (2006.01)
*G06F 13/12* (2006.01)

(52) U.S. Cl.
CPC .......... *G06F 13/364* (2013.01); *G06F 13/126* (2013.01)

(58) Field of Classification Search
CPC .................................................. G06F 13/126
See application file for complete search history.

(56) References Cited

U.S. PATENT DOCUMENTS

| | | | |
|---|---|---|---|
| 4,633,394 A | 12/1986 | Georgiou et al. | |
| 4,730,268 A | 3/1988 | Marin | |
| 4,794,516 A | 12/1988 | Auerbach et al. | |
| 5,168,568 A | 12/1992 | Thayer et al. | |
| 5,490,253 A | 2/1996 | Laha et al. | |
| 6,330,245 B1 | 12/2001 | Brewer et al. | |
| 6,535,941 B1 | 3/2003 | Kruse | |
| 6,647,439 B1 | 11/2003 | Nouvet et al. | |
| 6,697,904 B1 * | 2/2004 | Bennett | G06F 13/364 370/229 |
| 6,961,781 B1 * | 11/2005 | Mukherjee | H04L 45/302 709/232 |
| 7,249,210 B2 | 7/2007 | Ganasan et al. | |
| 7,366,810 B2 | 4/2008 | Chang | |

(Continued)

OTHER PUBLICATIONS

Appendix P; List of IBM Patent or Applications Treated as Related, Mar. 7, 2017, 2 pages.

(Continued)

*Primary Examiner* — Tammara R Peyton (74) *Attorney, Agent, or Firm* — Nathan M. Rau (57) ABSTRACT

Managing starvation in a distributed arbitration scheme including sending, by a starved local arbiter, a starvation message toward a head arbiter, wherein the starvation message comprises an identifier of the starved local arbiter and a request for resources to transfer data to a destination, wherein the requested resources comprise a destination token and a bus slot; receiving, by a neighboring local arbiter, the starvation message, wherein the neighboring local arbiter is between the starved local arbiter and the head arbiter; if the neighboring local arbiter currently has the resources requested in the starvation message: marking, by the neighboring local arbiter, the requested resources with the identifier of the starved local arbiter.

20 Claims, 5 Drawing Sheets

(56) References Cited

U.S. PATENT DOCUMENTS

| | | | |
|---|---|---|---|
| 7,525,986 B2* | 4/2009 | Lee | G06F 13/364 |
| | | | 370/462 |
| 7,990,978 B1 | 8/2011 | Chamas et al. | |
| 8,001,504 B1 | 8/2011 | Campbell | |
| 8,356,128 B2 | 1/2013 | Mittal | |
| 8,774,199 B2 | 7/2014 | Black et al. | |
| 9,143,122 B1 | 9/2015 | Gaide | |
| 9,489,314 B2* | 11/2016 | Chirca | H04L 63/0263 |
| 9,563,594 B2 | 2/2017 | Dixon et al. | |
| 2002/0146022 A1 | 10/2002 | Van Doren et al. | |
| 2004/0028054 A1 | 2/2004 | Khurana et al. | |
| 2005/0060456 A1 | 3/2005 | Shrader et al. | |
| 2006/0041705 A1 | 2/2006 | Bueti et al. | |
| 2007/0263625 A1 | 11/2007 | Engstrand | |
| 2008/0162745 A1 | 7/2008 | Tkacik et al. | |
| 2008/0209093 A1 | 8/2008 | Huang et al. | |
| 2011/0179248 A1 | 7/2011 | Lee | |
| 2012/0072631 A1 | 3/2012 | Chirca et al. | |
| 2013/0054856 A1 | 2/2013 | Lim et al. | |
| 2013/0297806 A1 | 11/2013 | Catangiu | |
| 2015/0347333 A1 | 12/2015 | Dixon et al. | |
| 2015/0347334 A1 | 12/2015 | Dixon et al. | |
| 2015/0347340 A1 | 12/2015 | Dixon et al. | |
| 2015/0347343 A1 | 12/2015 | Dixon et al. | |

OTHER PUBLICATIONS

Bajaj et al., *Arbitration Schemes for Multiprocessor Shared Bus*, Chapter 20, New Trends and Developments in Automotive System Engineering, Jan. 2011, pp. 395-410, intechopen.com (online), URL: www.intechopen.com/books/new-trends-and-developments-in-automotive-system-engineering.

Clark et al., *Cell Broadband Engine Interconnect and Memory Interface*, IBM Systems and Technology Group Manual 2005 (month unknown), 22 pages, International Business Machines Corporation, Armonk, NY.

Kallakuri et al., *Customization of Arbitration Policies and Buffer Space Distribution using Continuous Time Markov Decision Processes*, IEEE Transactions on Very Large Scale Integration (VLSI) Systems, vol. 15, Issue 2, Feb. 2007, pp. 1-5, IEEE Xplore Digital Library (IEEE.org) online, DOI: 10.1109/TVLSI.2007.895003.

Cuesta et al., *An Effective Starvation Avoidance Mechanism to Enhance the Token Coherence Protocol*, 15th Euromicro International Conference on Parallel, Distributed and Network-Based Processing (PDP'07), dated Feb. 2007, 8 pages, IEEE Computer Society (online, IEEE.org), DOI: 10.1109/PDP.2007.22.

* cited by examiner

MANAGING STARVATION IN A DISTRIBUTED ARBITRATION SCHEME

BACKGROUND

Field of the Invention

The field of the invention is data processing, or, more specifically, methods, apparatus, and products for managing starvation in a distributed arbitration scheme.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for managing starvation in a distributed arbitration scheme are disclosed in this specification. Managing starvation in a distributed arbitration scheme includes sending, by a starved local arbiter, a starvation message toward a head arbiter, wherein the starvation message comprises an identifier of the starved local arbiter and a request for resources to transfer data to a destination, wherein the requested resources comprise a destination token and a bus slot; receiving, by a neighboring local arbiter, the starvation message, wherein the neighboring local arbiter is between the starved local arbiter and the head arbiter; if the neighboring local arbiter currently has the resources requested in the starvation message: marking, by the neighboring local arbiter, the requested resources with the identifier of the starved local arbiter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
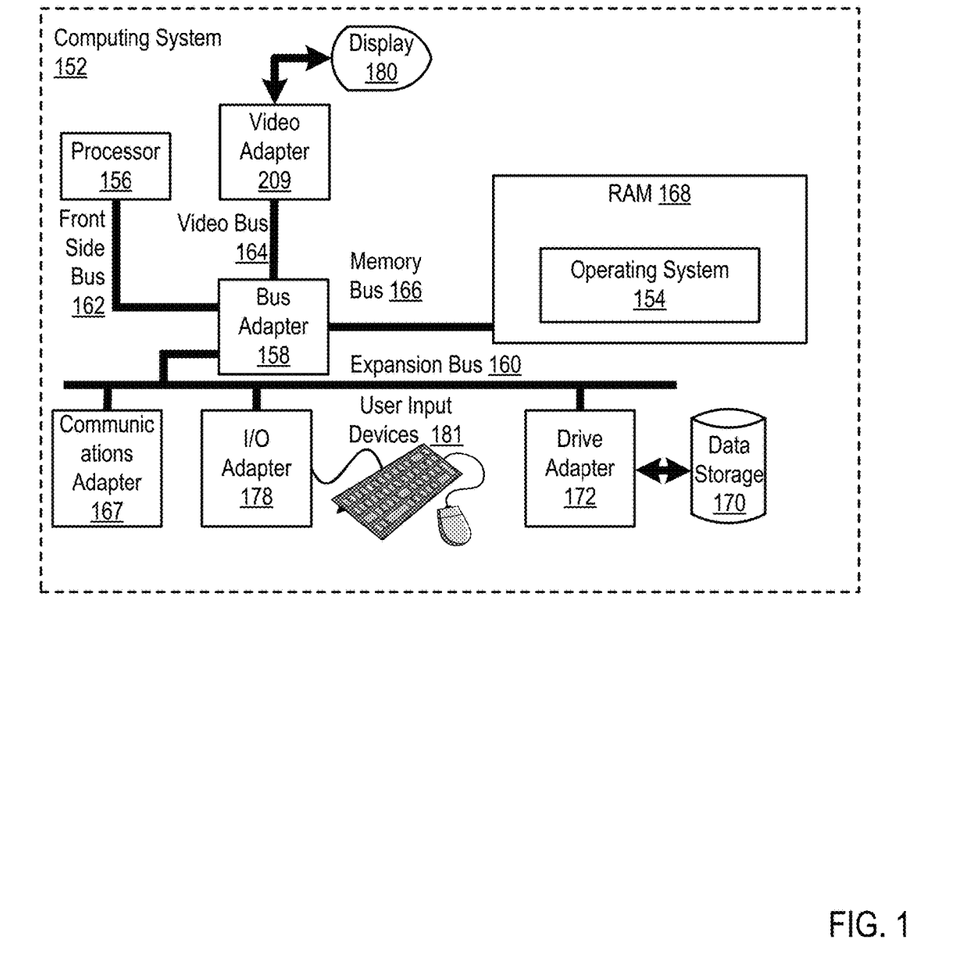
FIG. 1 sets forth a block diagram of an example system configured for managing starvation in a distributed arbitration scheme according to embodiments of the present invention.

Exemplary methods, apparatus, and products for managing starvation in a distributed arbitration scheme in accordance with the present invention are described with reference to the accompanying drawings, beginning with FIG. 1. FIG. 1 sets forth a block diagram of automated computing machinery comprising an exemplary computing system (152) configured for managing starvation in a distributed arbitration scheme according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for managing starvation in a distributed arbitration scheme according to embodiments of the present invention include UNIX™, Linux™, Microsoft XP™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for managing starvation in a distributed arbitration scheme according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for managing starvation in a distributed arbitration scheme according to embodiments of the present invention include modems for wired dial-up communications, Ethernet (IEEE 802.3) adapters for wired data communications, and 802.11 adapters for wireless data communications.

Figure 2:
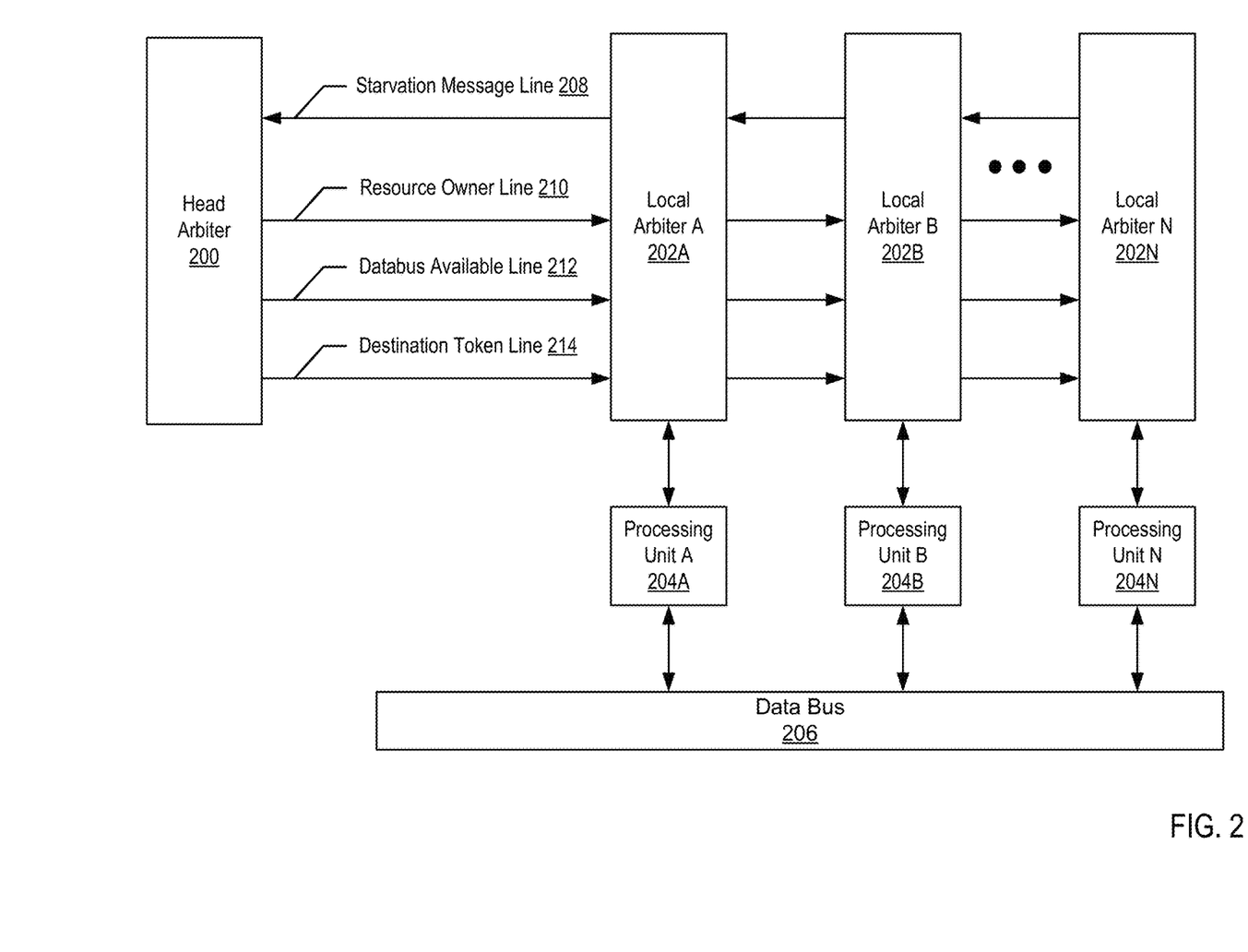
FIG. 2 sets forth a block diagram of an example system configured for managing starvation in a distributed arbitration scheme according to embodiments of the present invention.

FIG. 2 shows a system configured for managing starvation in a distributed arbitration scheme in accordance with the present invention. As shown in FIG. 2, the system includes a head arbiter (200) and a group of local arbiters (local arbiter A (202A), local arbiter B (202B), local arbiter N (202N)). Each local arbiter (local arbiter A (202A), local arbiter B (202B), local arbiter N (202N)) is communicatively coupled to a processing unit (processing unit A (204A), processing unit B (204B), processing unit N (204N)), and each processing unit is communicatively coupled to the data bus (206). Although not depicted in FIG. 2, each element shown in FIG. 2 is part of an electronic chip.

Each arbiter (head arbiter (200), local arbiter A (202A), local arbiter B (202B), local arbiter N (202N)) is a collection of circuitry and logic with functionality to manage data transfer resources on an electronic chip. The head arbiter (200) manages data transfer resources, such as data bus (206), for a group of local arbiters (local arbiter A (202A), local arbiter B (202B), local arbiter N (202N)). The head arbiter (200) may have control over the data transfer resources such that the head arbiter (200) may assign certain resources to a specific local arbiter based on a request or condition, such as starvation of that local arbiter.

The local arbiters (local arbiter A (202A), local arbiter B (202B), local arbiter N (202N)) secure data transfer resources for processing units (processing unit A (204A), processing unit B (204B), processing unit N (204N)). Although FIG. 2 shows each local arbiter attached to one processing unit, each local arbiter may secure data transfer resources on behalf of more than one processing unit. Each local arbiter may include request logic that acquires resources on behalf of the processing unit, and starvation logic that generates starvation messages and handles starvation messages received from other local arbiters. Each local arbiter may have a unique identifier that identifies the local arbiter, and the unique identifier may be shared with a unique identifier of the attached processing unit.

Each processing unit (processing unit A (204A), processing unit B (204B), processing unit N (204N)) is an element of an electronic chip capable of sending and/or receiving data. The processing units may be processing cores, memory controllers, data links, interrupt units, etc. Each processing unit includes at least one buffer to receive data from the data bus (306). Each processing unit is also associated with a destination token on the destination token line. The destination token represents an empty slot in the buffer of the destination processing unit.

Each local arbiter and associated processing unit or units may be separated into different time zones. A time zone may represent both a location and distance unit for a system cycle. For example, data may take three cycles to travel between local arbiters three time zones away from each other.

The data bus (206) is media upon which data is transferred between processing units. At a given time, the data bus (206) may have a free bus slot available for the transfer of data. The bus slot carries data to the next time zone toward the destination. The data bus (206) may include one bus going upstream and one bus going downstream.

Information on each downstream data line (the resource owner line (210), the databus available line (212), the destination token line (214)) moves downstream (i.e., away from the head arbiter) during each cycle or unit of cycles. Each starvation message on the starvation message line (208) moves upstream (i.e., toward the head arbiter) during each cycle or unit of cycles.

The starvation message line (208) is a data line that carries starvation messages upstream from the local arbiters. Specifically, the starvation message line (208) connects each local arbiter with that arbiter's adjacent local arbiters (or head arbiter). A starvation message may include a starvation tag, an identifier of the local arbiter that generated the starvation message, and a request for resources. The request for resources may include an identifier of a destination token indicating the destination processing unit. The starvation message may also include a starvation tag to distinguish the type of message from any other types of information transmitted on the starvation message line (208).

The databus available line (212) is a data line that carries information regarding whether the data bus slot has been reserved. The databus available line (212) may indicate either "available" or "unavailable". The resource owner line (210) is a data line that carries an identifier of the local arbiter for which the data bus slot has been reserved, if the data bus slot has been reserved.

The destination token line (214) is a data line that carries tokens for each processing unit destination. The destination token line (214) may be part of a token ring. Each location on the token ring includes the ability to read the currently available and unavailable destination tokens for that time zone. At each cycle (or unit of cycles) each local arbiter may examine the destination tokens for each destination processing unit available to the local arbiter. For example, a local arbiter may read the destination tokens during one cycle as "local arbiter A=available; local arbiter B=unavailable; local arbiter N=unavailable". Tokens may take the form of a series of bits where the location of the bit identifies the local arbiter, and the bit itself indicates availability (e.g., "100").

In order to transfer data between processing units, the local arbiter, on behalf of the source processing unit, secures an empty slot on the data bus (206) and a destination token. For example, assume that local arbiter A (202A) has received a resource request from processing unit A (204A) to send data to processing unit N (204N). Local arbiter A (202A) reads the databus available line (212) and determines that the databus available line (212) indicates that the data bus (206) is currently available. Local arbiter A (202A) then inspects the destination token line (214) to determine that a token for processing unit N (204N) is available.

Local arbiter A (202A) then writes the identifier of itself or the requesting processing unit to the resource owner line (210) and writes to the databus available line (212) to indicate that the databus is no longer available. Local arbiter A (202A) then removes the destination token for processing unit N (204N), then informs processing unit A (204A) that the resources are available and that data transfer may begin.

If the databus available line (212) indicates that no data slot is available, or if the destination token line (214) indicates that there is no destination token available for the desired destination processing unit, then the local arbiter will wait another cycle (or unit of cycles) and recheck the data lines. The local arbiter may also begin a starvation counter. The starvation counter indicates an amount of time or cycles to wait before a starvation state is detected and a starvation message is generated and sent. During each cycle or unit of cycles before the starvation counter expires, the local arbiter may continue to inspect the data lines for the requested resources.

Figure 3:
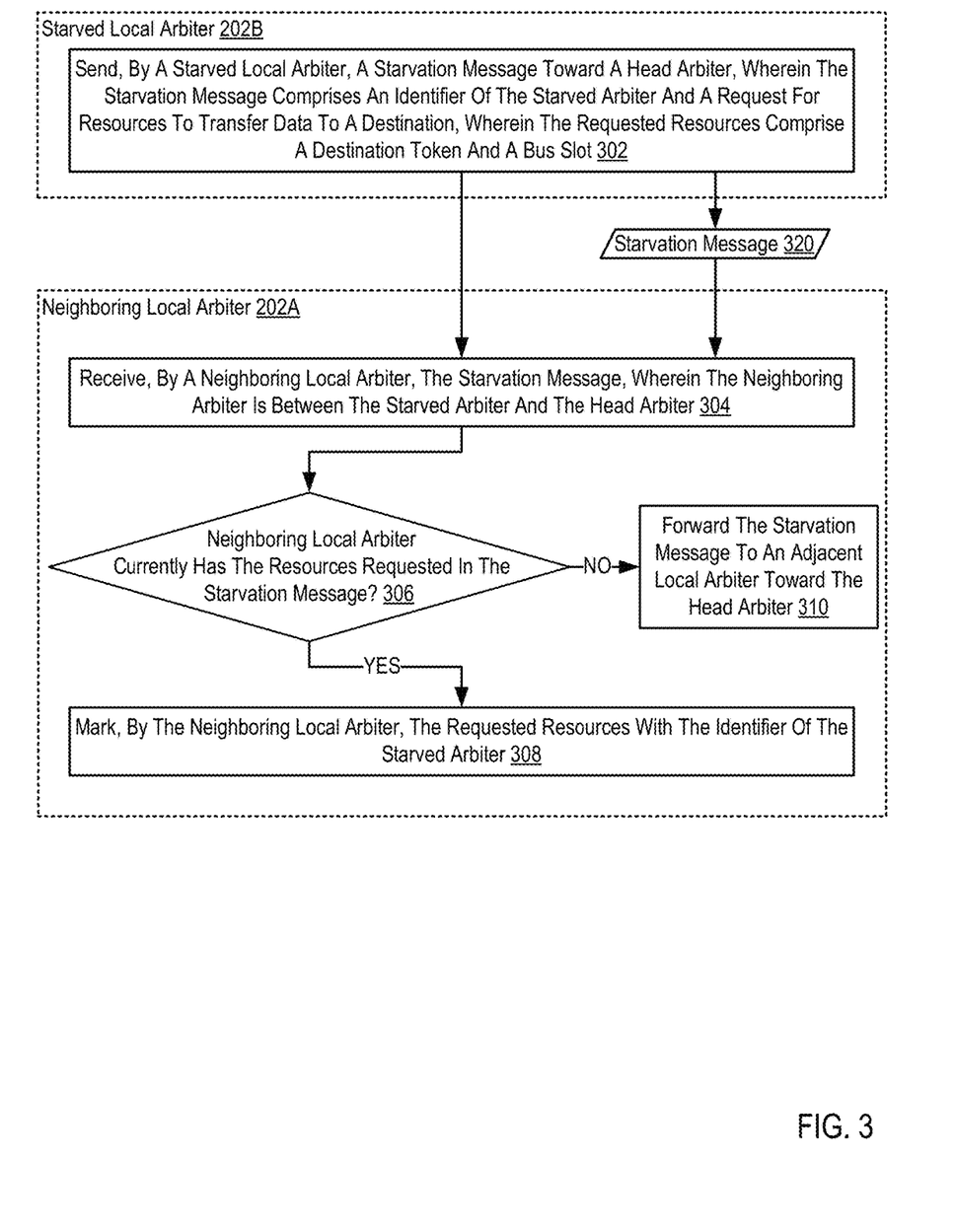
FIG. 3 sets forth a flow chart illustrating an exemplary method for managing starvation in a distributed arbitration scheme according to embodiments of the present invention.

For further explanation, FIG. 3 sets forth a flow chart illustrating an exemplary method for managing starvation in a distributed arbitration scheme according to embodiments of the present invention. The method of FIG. 3 includes sending (302), by a starved local arbiter (202B), a starvation message (320) toward a head arbiter, wherein the starvation message (320) comprises an identifier of the starved local arbiter and a request for resources to transfer data to a destination, wherein the requested resources comprise a destination token and a bus slot. Sending (302), by a starved local arbiter (202B), a starvation message (320) toward a head arbiter, wherein the starvation message (320) comprises an identifier of the starved local arbiter and a request for resources to transfer data to a destination, wherein the requested resources comprise a destination token and a bus slot may be carried out by receiving a resource request from processing unit.

The processing unit may request resources for use in transmitting data to another processing unit. In order to transmit data to the destination processing unit, the source processing unit requires a slot on the data bus and storage availability on the receive buffer of the destination processing unit. The resource request sent from the source processing unit to the local arbiter may include an identifier of the destination processing unit.

The resource request may be received by request logic within the local arbiter. Once the local arbiter determines that the resources are not immediately available, the local arbiter starts a starvation counter. Once the starvation counter has expired, a starvation message is generated that includes the identifier of the starved arbiter and an identifier of the destination processing unit (i.e., a request for the destination token.). The starvation message is then placed on the starvation message line to an upstream neighboring local arbiter.

Once the starved message is sent, the local arbiter waits until the resources become available and have been assigned to the requesting processing unit by another local arbiter or the head arbiter. Specifically, the local arbiter does not continue to monitor the data lines for the requested resources unless the resources have already been assigned to the requesting processing unit on the resource owner line.

The method of FIG. 3 also includes receiving (304), by a neighboring local arbiter (202A), the starvation message (320), wherein the neighboring local arbiter is between the starved local arbiter and the head arbiter. Receiving (304), by a neighboring local arbiter (202A), the starvation message (320), wherein the neighboring local arbiter is between the starved local arbiter and the head arbiter may be carried out by detecting a starvation message on the starvation message line. During each cycle (or unit of cycles) each local arbiter may inspect the starvation message line to determine if a starvation message has been received.

The method of FIG. 3 also includes determining (306) whether the neighboring local arbiter currently has the resources requested in the starvation message (320). Determining whether (306) the neighboring local arbiter currently has the resources requested in the starvation message (320) may be carried out by inspecting the databus available line and the destination token line. The neighboring local arbiter may first inspect the databus available line to determine whether there is any availability on the data bus. If the databus available line indicates there is no availability on the data bus, then the neighboring local arbiter forwards the starvation message to the next adjacent upstream local arbiter.

If the databus available line indicates there is availability on the data bus, then the neighboring local arbiter, inspects the destination token line to determine whether there is an available token for the destination processor unit. If the destination token line indicates that a destination token for the destination processor unit is unavailable, then the neighboring local arbiter forwards the starvation message to the next adjacent upstream local arbiter. If the destination token line indicates that a destination token for the destination processor unit is available, then the neighboring local arbiter determines that the requested resources for the starvation message are currently available to the neighboring local arbiter.

Determining whether (306) the neighboring local arbiter currently has the resources requested in the starvation message (320) may also be carried out by inspecting both the current contents of the data lines and the data line contents to be received during the next cycle or unit of cycles. Each local arbiter may be functionally able to determine the information on each data line that will be received in the next cycle or unit of cycles. Consequently, the neighboring local arbiter may perform the same steps described above in reference to step 306 for the information on the data lines incoming during the next cycle.

The neighboring local arbiter may also have received a request for the same resources from a processing unit coupled to the neighboring local arbiter. The neighboring local arbiter may give priority to the starved local arbiter over the local processing unit request. This condition may result in the initiation of, or continuation of, a starvation counter on the neighboring local arbiter.

The method of FIG. 3 also includes, if the neighboring local arbiter currently has the resources requested in the starvation message, marking (308), by the neighboring local arbiter (202A), the requested resources with the identifier of the starved local arbiter (202B). Marking (308), by the neighboring local arbiter (202A), the requested resources with the identifier of the starved local arbiter (202B) may be carried out by writing the identifier of the starved local arbiter (or starved processing unit) to a resource owner line, marking the databus available line as unavailable, and removing the destination token on a token ring. The identifier of the starved arbiter may be identical to the identifier of the starved processing unit. Specifically, the starved arbiter may be identified using the identifier of the starved processing unit.

The method of FIG. 3 also includes, if the neighboring local arbiter does not currently have the resources requested in the starvation message, forwarding (310) the starvation message to an adjacent local arbiter toward the head arbiter. Forwarding (310) the starvation message to an adjacent local arbiter toward the head arbiter may be carried out by placing or leaving the starvation message on the starvation message line so that during the next cycle or unit of cycles, the starvation message travels to the next upstream adjacent local arbiter.

Figure 4:
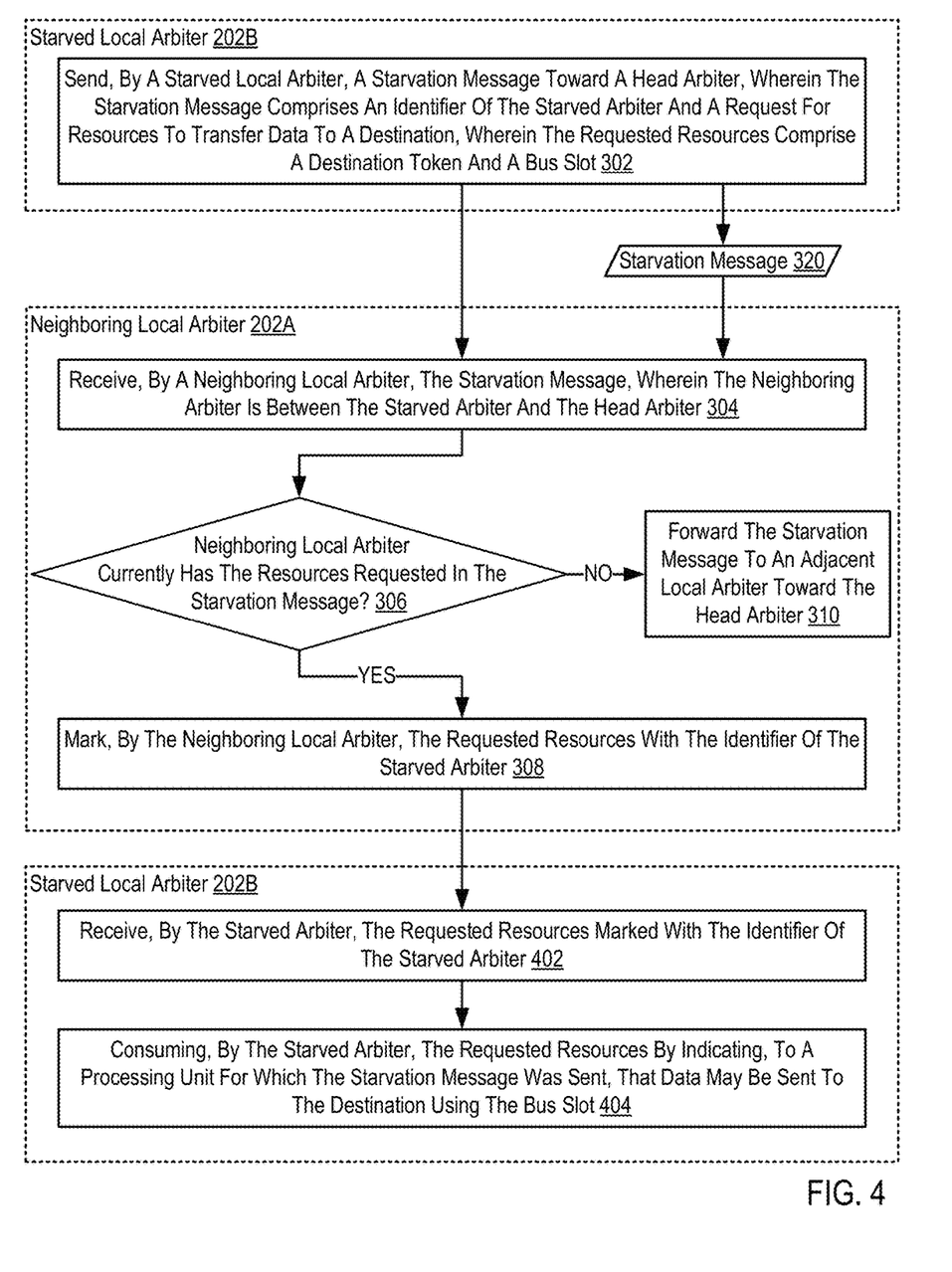
FIG. 4 sets forth a flow chart illustrating an exemplary method for managing starvation in a distributed arbitration scheme according to embodiments of the present invention.

For further explanation, FIG. 4 sets forth a flow chart illustrating a further exemplary method for managing starvation in a distributed arbitration scheme according to embodiments of the present invention that includes sending (302), by a starved local arbiter (202B), a starvation message (320) toward a head arbiter, wherein the starvation message (320) comprises an identifier of the starved local arbiter and a request for resources to transfer data to a destination, wherein the requested resources comprise a destination token and a bus slot; receiving (304), by a neighboring local arbiter (202A), the starvation message (320), wherein the neighboring local arbiter is between the starved local arbiter and the head arbiter; if (306) the neighboring local arbiter currently has the resources requested in the starvation message (320): marking (308), by the neighboring local arbiter (202A), the requested resources with the identifier of the starved local arbiter (202B).

Figure 5:
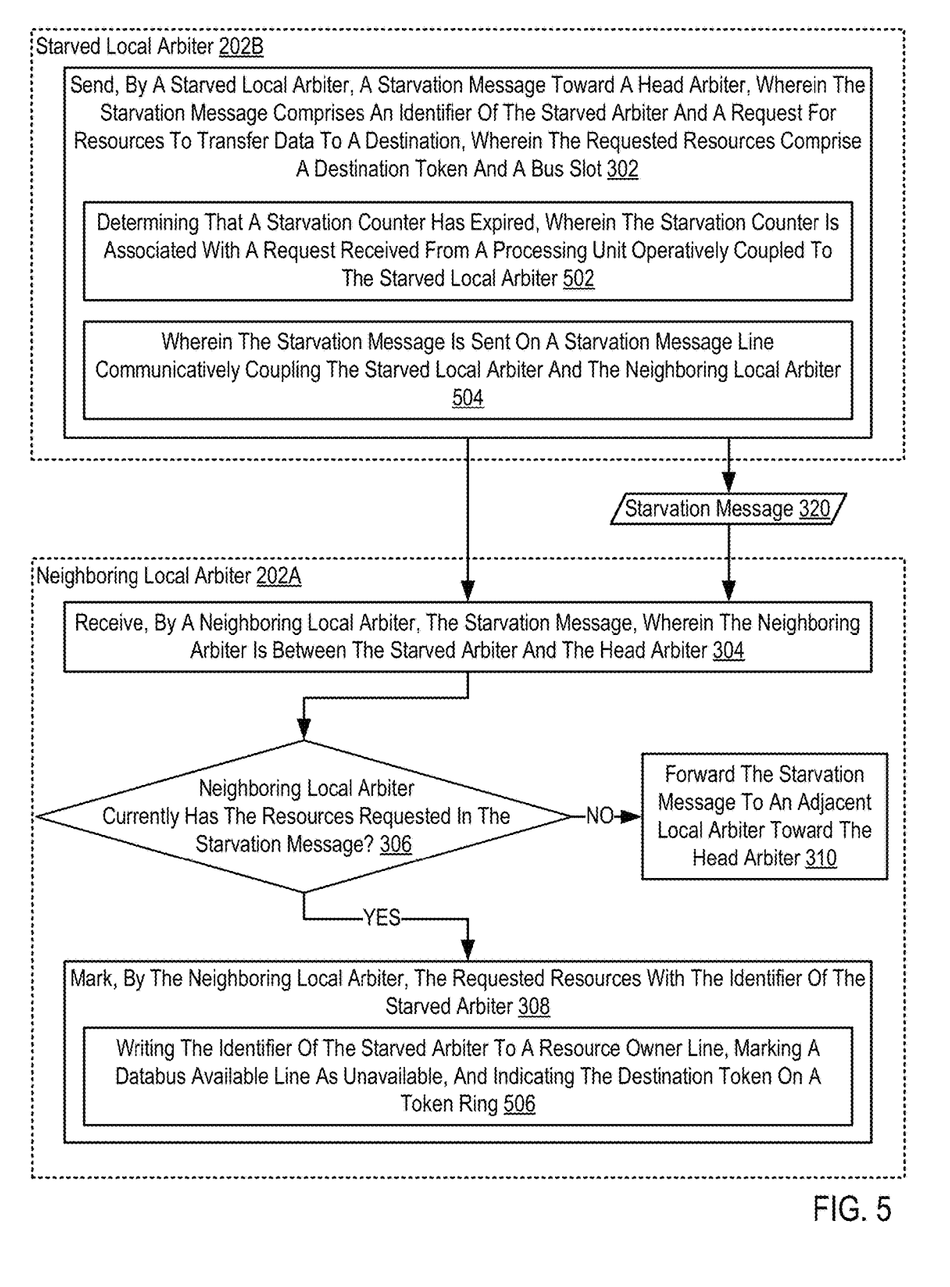
FIG. 5 sets forth a flow chart illustrating an exemplary method for managing starvation in a distributed arbitration scheme according to embodiments of the present invention.

The method of FIG. 4 differs from the method of FIG. 3, however, in that FIG. 5 further includes receiving (402), by the starved local arbiter (202B), the requested resources marked with the identifier of the starved local arbiter (202B); and consuming (404), by the starved local arbiter (202B), the requested resources by indicating, to a processing unit for which the starvation message was sent, that data may be sent to the destination using the bus slot.

Receiving (402), by the starved local arbiter (202B), the requested resources marked with the identifier of the starved local arbiter (202B) may be carried out by the starved local arbiter inspecting the resource owner line and determining that the resource owner line matches the identifier of the starved local arbiter (or starved processing unit). The requested resources marked with the identifier of the starved local arbiter may be received during a subsequent cycle or unit of cycles after the information is placed on the resource owner line by the neighboring local arbiter.

Consuming (404), by the starved local arbiter (202B), the requested resources by indicating, to a processing unit for which the starvation message was sent, that data may be sent to the destination using the bus slot may be carried out by notifying the starved processing unit that a bus slot on the data bus is available to transmit the data to the destination processing unit. Because the data lines have been marked by the neighboring local arbiter for the starved processing unit, it may not be necessary for the starved local arbiter to alter or add information to the data lines.

For further explanation, FIG. 5 sets forth a flow chart illustrating a further exemplary method for managing starvation in a distributed arbitration scheme according to embodiments of the present invention that includes sending (302), by a starved local arbiter (202B), a starvation message (320) toward a head arbiter, wherein the starvation message (320) comprises an identifier of the starved local arbiter and a request for resources to transfer data to a destination, wherein the requested resources comprise a destination token and a bus slot; receiving (304), by a neighboring local arbiter (202A), the starvation message (320), wherein the neighboring local arbiter is between the starved local arbiter and the head arbiter; if (306) the neighboring local arbiter currently has the resources requested in the starvation message (320): marking (308), by the neighboring local arbiter (202A), the requested resources with the identifier of the starved local arbiter (202B).

The method of FIG. 5 differs from the method of FIG. 3, however, in that sending (302), by a starved local arbiter (202B), a starvation message (320) toward a head arbiter includes determining (502) that a starvation counter has expired, wherein the starvation counter is associated with a request received from a processing unit operatively coupled to the starved local arbiter (202B); and wherein (504) the starvation message (320) is sent on a starvation message line communicatively coupling the starved local arbiter (202B) and the neighboring local arbiter (202A).

Determining (502) that a starvation counter has expired, wherein the starvation counter is associated with a request received from a processing unit operatively coupled to the starved local arbiter (202B) may be carried out by initiating a starvation counter upon receiving the request for resources from the local processing unit, or upon determining that the requested resources are not currently available. During each cycle or unit of cycles, the starvation counter is decremented until the counter has expired. The starvation counter may begin at a programmable value, or a dynamic value that changes based on characteristics of the system. For example, the tolerable amount of starvation counter may change based on system load, time zone priority, power consumption, etc.

Sending the starvation message (320) on a starvation message line communicatively coupling the starved local arbiter (202B) and the neighboring local arbiter (202A) may be carried out by placing the data for the starvation message on the starvation message line such that during the next cycle or unit of cycles, the starvation message is delivered to the nearest upstream local arbiter, without being first delivered to the head arbiter.

The method of FIG. 5 also differs from the method of FIG. 3, however, in that marking (308), by the neighboring local arbiter (202A), the requested resources with the identifier of the starved local arbiter (202B) includes writing (506) the identifier of the starved local arbiter to a resource owner line, marking a databus available line as unavailable, and indicating the destination token on a token ring. Writing (506) the identifier of the starved local arbiter to a resource owner line, marking a databus available line as unavailable, and indicating the destination token on a token ring may be carried out by writing the identifier of the starved processing unit to the resource owner line. Marking the database available line as unavailable may include switching an up bit (i.e., "1") to a down bit (i.e., "0") to indicate unavailability. Indicating the destination token on a token ring may include removing the destination token for the destination processing unit form the destination token line.

In view of the explanations set forth above, readers will recognize that the benefits of managing starvation in a distributed arbitration scheme according to embodiments of the present invention include:

Improving the operation of electronic chips by enabling each upstream local arbiter to address starvation messages received from downstream local arbiters, increasing the functionality of electronic chips.

Improving the operation of electronic chips that include a large number of arbiters on each trunk by distributing starvation condition resolution among local arbiters, increasing the efficiency of electronic chips.

Exemplary embodiments of the present invention are described largely in the context of a fully functional computer system for managing starvation in a distributed arbitration scheme. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing starvation in a distributed arbitration scheme, the method comprising:
    sending, by a starved local arbiter, a starvation message toward a head arbiter, wherein the starvation message comprises an identifier of the starved local arbiter and a request for resources to transfer data to a destination, wherein the requested resources comprise a destination token and a bus slot;
    receiving, by a neighboring local arbiter, the starvation message, wherein the neighboring local arbiter is between the starved local arbiter and the head arbiter;
    if the neighboring local arbiter currently has the resources requested in the starvation message:
        marking, by the neighboring local arbiter, the requested resources with the identifier of the starved local arbiter.

2. The method of claim 1, further comprising:
    if the neighboring local arbiter does not currently have the resources requested in the starvation message:
        forwarding the starvation message to an adjacent local arbiter toward the head arbiter.

3. The method of claim 1, further comprising:
    receiving, by the starved local arbiter, the requested resources marked with the identifier of the starved local arbiter; and
    consuming, by the starved local arbiter, the requested resources by indicating, to a processing unit for which the starvation message was sent, that data may be sent to the destination using the bus slot.

4. The method of claim 1, wherein marking, by the neighboring local arbiter, the requested resources with the identifier of the starved local arbiter comprises writing the identifier of the starved local arbiter to a resource owner line, marking a databus available line as unavailable, and indicating the destination token on a token ring.

5. The method of claim 1, wherein sending, by a starved local arbiter, a starvation message to a head arbiter comprises:
    determining that a starvation counter has expired, wherein the starvation counter is associated with a request received from a processing unit operatively coupled to the starved local arbiter.

6. The method of claim 1, wherein the starvation message is sent on a starvation message line communicatively coupling the starved local arbiter and the neighboring local arbiter.

7. The method of claim 1, wherein the destination is a processing unit, and wherein the processing unit, the starved local arbiter, the neighboring local arbiter, and the head arbiter are location on a computer chip.

8. An electronic chip that managing starvation in a distributed arbitration scheme, the electronic chip having disposed within it logic that causes the electronic chip to carry out the steps of:
    sending, by a starved local arbiter, a starvation message toward a head arbiter, wherein the starvation message comprises an identifier of the starved local arbiter and a request for resources to transfer data to a destination, wherein the requested resources comprise a destination token and a bus slot;
    receiving, by a neighboring local arbiter, the starvation message, wherein the neighboring local arbiter is between the starved local arbiter and the head arbiter;
    if the neighboring local arbiter currently has the resources requested in the starvation message:
        marking, by the neighboring local arbiter, the requested resources with the identifier of the starved local arbiter.

9. The electronic chip of claim 8, the steps further comprising:
    if the neighboring local arbiter does not currently have the resources requested in the starvation message:
        forwarding the starvation message to an adjacent local arbiter toward the head arbiter.

10. The electronic chip of claim 8, the steps further comprising:
    receiving, by the starved local arbiter, the requested resources marked with the identifier of the starved local arbiter; and
    consuming, by the starved local arbiter, the requested resources by indicating, to a processing unit for which the starvation message was sent, that data may be sent to the destination using the bus slot.

11. The electronic chip of claim 8, wherein marking, by the neighboring local arbiter, the requested resources with the identifier of the starved local arbiter comprises writing the identifier of the starved local arbiter to a resource owner line, marking a databus available line as unavailable, and indicating the destination token on a token ring.

12. The electronic chip of claim 8, wherein sending, by a starved local arbiter, a starvation message to a head arbiter comprises:
    determining that a starvation counter has expired, wherein the starvation counter is associated with a request received from a processing unit operatively coupled to the starved local arbiter.

13. The electronic chip of claim 8, wherein the starvation message is sent on a starvation message line communicatively coupling the starved local arbiter and the neighboring local arbiter.

14. The electronic chip of claim 8, wherein the destination is a processing unit, and wherein the processing unit, the starved local arbiter, the neighboring local arbiter, and the head arbiter are location on a computer chip.

15. A computer program product for managing starvation in a distributed arbitration scheme, the computer program product disposed upon an electronic chip, the computer program product comprising computer program instructions that, when executed, cause the electronic chip to carry out the steps of:
    sending, by a starved local arbiter, a starvation message toward a head arbiter, wherein the starvation message comprises an identifier of the starved local arbiter and a request for resources to transfer data to a destination, wherein the requested resources comprise a destination token and a bus slot;
    receiving, by a neighboring local arbiter, the starvation message, wherein the neighboring local arbiter is between the starved local arbiter and the head arbiter;
    if the neighboring local arbiter currently has the resources requested in the starvation message:

marking, by the neighboring local arbiter, the requested resources with the identifier of the starved local arbiter.

16. The computer program product of claim 15, the steps further comprising:
    if the neighboring local arbiter does not currently have the resources requested in the starvation message:
        forwarding the starvation message to an adjacent local arbiter toward the head arbiter.

17. The computer program product of claim 15, the steps further comprising:
    receiving, by the starved local arbiter, the requested resources marked with the identifier of the starved local arbiter; and
    consuming, by the starved local arbiter, the requested resources by indicating, to a processing unit for which the starvation message was sent, that data may be sent to the destination using the bus slot.

18. The computer program product of claim 15, wherein marking, by the neighboring local arbiter, the requested resources with the identifier of the starved local arbiter comprises writing the identifier of the starved local arbiter to a resource owner line, marking a databus available line as unavailable, and indicating the destination token on a token ring.

19. The computer program product of claim 15, wherein sending, by a starved local arbiter, a starvation message to a head arbiter comprises:
    determining that a starvation counter has expired, wherein the starvation counter is associated with a request received from a processing unit operatively coupled to the starved local arbiter.

20. The computer program product of claim 15, wherein the starvation message is sent on a starvation message line communicatively coupling the starved local arbiter and the neighboring local arbiter.

\* \* \* \* \*